US009473664B2

(12) United States Patent
Ikeno et al.

(10) Patent No.: US 9,473,664 B2
(45) Date of Patent: *Oct. 18, 2016

(54) IMAGE SCANNER WITH DIVIDING MEMBER

(71) Applicant: Brother Kogyo Kabushiki Kaisha, Nagoya-shi, Aichi-ken (JP)

(72) Inventors: Takahiro Ikeno, Owariasahi (JP); Yoichi Susaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,718

(22) Filed: Sep. 4, 2015

(65) Prior Publication Data

US 2015/0381844 A1    Dec. 31, 2015

Related U.S. Application Data

(60) Continuation of application No. 14/148,190, filed on Jan. 6, 2014, now Pat. No. 9,167,119, which is a continuation of application No. 13/551,646, filed on Jul. 18, 2012, now Pat. No. 8,659,802, which is a (Continued)

(30) Foreign Application Priority Data

Jul. 27, 2004   (JP) ................................. 2004-219050
May 31, 2005   (JP) ................................. 2005-158815

(51) Int. Cl.
*H04N 1/00*       (2006.01)
*H04N 1/10*       (2006.01)
(Continued)

(52) U.S. Cl.
CPC ...... *H04N 1/00997* (2013.01); *H04N 1/00615* (2013.01); *H04N 1/1017* (2013.01);
(Continued)

(58) Field of Classification Search
None
See application file for complete search history.

(56) References Cited

U.S. PATENT DOCUMENTS 4,644,159 A     2/1987    Miura
4,698,669 A    10/1987    Sekizawa et al.
(Continued)

FOREIGN PATENT DOCUMENTS

JP    63-063272 A    3/1988
JP    03-079161 A    4/1991
(Continued)

OTHER PUBLICATIONS

Examination Report dated Jan. 12, 2006 in Application No. EP05 254 664.
(Continued)

*Primary Examiner* — Mohammad Ghayour
*Assistant Examiner* — Lennin Rodriguezgonzale
(74) *Attorney, Agent, or Firm* — Banner & Witcoff, Ltd.

(57) ABSTRACT

An image scanner includes a transparent plate, a scanning device, a driving device, a positioning member, a light absorbing portion and a white reference portion. The transparent plate has an original placing surface. The scanning device irradiates an original with light by means of a light source and scans reflected light from the original. The driving device reciprocates the scanning device along the transparent plate. The positioning member positions the original placed on the original placing surface of the transparent plate. The light absorbing portion, which is disposed on the original placing surface side of the positioning member and at substantially a central portion of the positioning member in moving directions of the scanning device, absorbs ambient light entering to the original placing surface side of the positioning member through the transparent plate. The white reference portion is provided to the original placing surface side of the positioning member.

11 Claims, 13 Drawing Sheets

Related U.S. Application Data continuation of application No. 12/619,241, filed on Nov. 16, 2009, now Pat. No. 8,253,986, which is a division of application No. 11/190,017, filed on Jul. 27, 2005, now Pat. No. 7,639,404.

(51) Int. Cl.
  *H04N 1/193* (2006.01)
  *H04N 1/407* (2006.01)
  *H04N 1/04* (2006.01)
  *H04N 1/12* (2006.01)

(52) U.S. Cl.
  CPC ............ *H04N1/1061* (2013.01); *H04N 1/123* (2013.01); *H04N 1/193* (2013.01); *H04N 1/4076* (2013.01); *H04N 1/0464* (2013.01); *H04N 1/12* (2013.01); *H04N 2201/0081* (2013.01); *H04N 2201/044* (2013.01); *H04N 2201/0422* (2013.01)

(56) References Cited

U.S. PATENT DOCUMENTS

| | | | |
|---|---|---|---|
| 4,806,780 | A | 2/1989 | Yamamoto et al. |
| 4,807,045 | A | 2/1989 | Shimano |
| 5,339,139 | A | 8/1994 | Fullerton et al. |
| 5,583,611 | A | 12/1996 | Rutishauser |
| 5,651,623 | A | 7/1997 | Stodder et al. |
| 5,881,351 | A | 3/1999 | Shimotoso et al. |
| 5,970,181 | A | 10/1999 | Ohtsu |
| 6,144,467 | A | 11/2000 | Tsai |
| 6,292,269 | B1 | 9/2001 | Kawai |
| 6,301,019 | B1 | 10/2001 | Saito et al. |
| 6,489,601 | B1 | 12/2002 | Huang |
| 6,687,024 | B1 | 2/2004 | Short et al. |
| 6,892,945 | B2 | 5/2005 | Shishido |
| 7,149,002 | B2 | 12/2006 | Clifton |
| 7,283,285 | B2 | 10/2007 | Konno |
| 7,525,698 | B2 | 4/2009 | Horaguchi |
| 7,551,314 | B2 | 6/2009 | Cheung |
| 2001/0040707 | A1 | 11/2001 | Funakoshi et al. |
| 2002/0106218 | A1 | 8/2002 | Ozawa |
| 2002/0110389 | A1 | 8/2002 | Ozawa |
| 2005/0152010 | A1 | 7/2005 | Horaguchi |

FOREIGN PATENT DOCUMENTS

| | | |
|---|---|---|
| JP | 07-298007 A | 11/1995 |
| JP | 2000-115473 A | 4/2000 |
| JP | 2003-134307 A | 5/2003 |
| JP | 2003-179731 A | 6/2003 |
| JP | 2004-048436 A | 2/2004 |

OTHER PUBLICATIONS

Extended European Search Report dated Feb. 27, 2006 in Application No. EP05 254 664.
Notification of First Office Action dated Apr. 6, 2007 in Chinese Patent Application No. CN200510087628.0.
Notice of Reasons for Rejection for Application No. JP2005-158815; dated Apr. 14, 2009; with English Translation.
Final Office Action issued in U.S. Appl. No. 13/551,646 mailed Jun. 19, 2013.
Notice of Allowance issued in corresponding U.S. Appl. No. 13/551,646 mailed Oct. 4, 2013.
Jan. 29, 2015—(US) Non-Final Office Action—U.S. Appl. No. 14/148,190.
Jun. 8, 2015—(US) Notice of Allowance—U.S. Appl. No. 14/148,190.

IMAGE SCANNER WITH DIVIDING MEMBER

CROSS-REFERENCE TO RELATED APPLICATIONS

This is a continuation application of U.S. application Ser. No. 14/148,190, filed Jan. 6, 2014, which is a continuation of U.S. application Ser. No. 13/551,646, filed Jul. 18, 2012, now U.S. Pat. No. 8,659,802 which is a continuation of U.S. application Ser. No. 12/619,241, filed Nov. 16, 2009, now U.S. Pat. No. 8,253,986, which was a divisional application of U.S. application Ser. No. 11/190,017, filed Jul. 27, 2005, now U.S. Pat. No. 7,639,404, which claims the benefit of Japanese Patent Application No. 2004-219050 filed Jul. 27, 2004 and Japanese Patent Application No. 2005-158815 filed May 31, 2005 in the Japanese Patent Office, the disclosures of which are incorporated herein by reference.

BACKGROUND

The present invention relates to an image scanner, in which an original placed on an original placing surface of a transparent plate is scanned by a scanning device that is disposed opposite to the original placing surface with respect to the transparent plate, irradiates the original with light by means of a light source and scans the reflected light from the original, and to an image scanning method.

In a known example of conventional image scanners, a platen made of transparent glass is attached to an upper portion of a box housing with the upper portion opened, and a scanning device, such as a Contact Image Sensor (hereinafter referred to as "CIS"), is reciprocably provided under the platen. In the image scanner, an original is placed on the platen with a surface to be scanned facing down, and an image on the original is optically scanned by using the CIS. Then, a resulting light signal is converted into an electric signal to create image data.

In such an image scanner provided with a CIS, there are differences in optical properties among light receiving elements, and unevenness in illuminance among individual light sources. This sometimes results in variation in scanned values that is undesirably large for creation of image information. It is, therefore, necessary to perform some correction of the differences in optical properties among light receiving elements and of the unevenness in illuminance among individual light sources prior to image scanning by the CIS.

Generally, scanning of a white plate or a white roller is performed with a light source turned off prior to image scanning by the CIS, and the resulting light signal is converted into an electric signal. The electric signal is stored in a buffer memory as black image data. Then, the correction of image data of an original is performed based on the black image data. This may compensate for differences in optical properties among light receiving elements.

Further correction is performed as disclosed in Publication of Unexamined Japanese Patent Application No. 2000-115473. Specifically, the light source of the CIS is turned on, and the reflected light obtained from the white plate or the white roller as a white reference is focused onto light receiving elements and is scanned. The resulting light signal is converted into an electric signal, and the electric signal is stored in a buffer memory as white image data. Then, the correction of image data of the original is performed based on the white image data. This may compensate for unevenness in illuminance among individual light sources.

The image scanner is provided with an original pressing plate for covering the platen during scanning of the original. The original pressing plate is arranged so as to be openable/closable in a vertical direction (i.e., in upper and lower directions). However, image scanning of a thick original, such as a book original, using the CIS is performed with the original pressing plate opened with respect to the platen, while the spine of the book original is pressed downward in order to prevent causing a shadow from the binding margin.

SUMMARY

Image scanning performed with the original pressing plate opened leads to a problem that ambient light is allowed to enter the inside of the image scanner through the platen. Ambient light here means indoor and outdoor light entering the inside of the image scanner from transparent members, such as the platen, or openings of the image scanner. More specifically, ambient light entering the scanner through the platen may be reflected and travel through the platen, and may reflect on, for example, an internal surface of the housing after passing through the platen. Such ambient light may enter the white plate or the white roller as a white reference.

When the above described corrections are performed with the entry of ambient light, ambient light will cause the output of a black reference to be larger than an output of a proper black reference. That is, black image data is obtained as an output larger than proper black image data correspondingly to the amount of ambient light. Ambient light will also cause the output of a white reference to be larger than an output of a proper white reference. That is, white image data is obtained as an output larger than a proper white image data correspondingly to the amount of ambient light.

When corrections of image data obtained by image scanning of an original are performed using image data of black and white influenced by ambient light as described above, the white color in the original appears darker, and a darker image is provided. Specifically, since an output corresponding to the white of an original without an influence by ambient light is smaller than white image data with an influence by ambient light, the white is regarded as having a brightness lower than a proper white and corrected to a light gray level. As a result, a scanned image in an area of the original where ambient light does not enter becomes darker.

Especially, a black image having a lower black level is blurred. Specifically, an output curve of the CIS presents a gentle slope indicating small output differences on a black level side. Accordingly, when an output of black image data becomes larger due to an influence by ambient light, outputs corresponding to from a black level to a dark gray level of the original without an influence by ambient light becomes smaller than the black image data. As a result, outputs corresponding to from a black level to a dark gray level are all regarded as black in a corrected scanned image.

Such an influence by ambient light presents a problem particularly significant in an image scanner provided, in addition to the platen, with a slit glass for scanning an original conveyed by an original conveying apparatus, since an upper area over the slit glass is exposed allowing ambient light to enter.

More specifically, when the platen has an FBS area as a flat bed scanner (hereinafter referred to as "FBS") and an ADF area for scanning an original conveyed by an original conveying apparatus, such as an auto document feeder (hereinafter referred to as "ADF"), and a white reference portion is provided to an original placing surface side of a positioning member that divides into these areas, the ADF area remains exposed even if the FBS area is substantially covered with an original. Accordingly, ambient light enters the image scanner through the ADF area, and then enters the original placing surface side of the positioning member. On the contrary, most part of the original in the FBS area is not subject to an influence of ambient light since ambient light is substantially blocked by the original. Thus, the above described problem is likely to be caused.

The present invention, relating to an image scanner, in which an original placed on an original placing surface of a transparent plate is scanned by a scanning device that is disposed opposite to the original placing surface with respect to the transparent plate, irradiates the original with light by means of a light source and scans the reflected light from the original, and to an image scanning method, has an object to provide a device that prevents an influence of ambient light on a white reference portion provided to an original placing surface side of a positioning member, thereby to achieve an improved scanned image quality.

In one aspect of the present invention, there is provided an image scanner which comprises: a transparent plate, a scanning device, a driving device, a positioning member, a light absorbing portion, and a white reference portion. The transparent plate has an original placing surface for placing an original thereon. The scanning device, which is disposed opposite to the original placing surface with respect to the transparent plate, irradiates the original with light by means of a light source and scans the reflected light from the original. The driving device reciprocates the scanning device along the transparent plate. The positioning member positions the original placed on the original placing surface of the transparent plate. The light absorbing portion is disposed on the original placing surface side of the positioning member and at substantially a central portion of the positioning member in moving directions of the scanning device. The light absorbing portion absorbs ambient light traveling in the transparent plate. The white reference portion is provided to the original placing surface side of the positioning member.

An original to be image scanned is placed on the original placing surface of the transparent plate in accordance with the positioning member. While the scanning device is moved by the driving device, the scanning device irradiates light to the original from the light source, and scans the reflected light. Thus, image scanning of the original is performed.

Prior to the image scanning, the scanning device is moved by the driving device to a position corresponding to the light absorbing portion and a position corresponding to the white reference portion. Then, black reference data is obtained with respect to the light absorbing portion, and white reference data is obtained with respect to the white reference portion. When an area of the original placing surface, on which the original is not placed, is exposed to the outside, ambient light enters inside the image scanner through the area. The ambient light, which has entered the transparent plate from the outside, is reflected in the transparent plate, and may enter the original placing surface side of the positioning member. Also, the ambient light may pass through the transparent plate, be reflected by an internal surface of a main body (i.e., a housing) of the image scanner, again pass through the transparent plate, and enter the original placing surface side of the positioning member. On the original placing surface side of the positioning member, the light absorbing portion absorbs the ambient light which has entered thereinto.

Accordingly, an influence of ambient light on black reference data can be prevented when black reference data is to be obtained with respect to the light absorbing portion. It is, therefore, possible to obtain accurate black reference data corresponding to the black color of the original, and thereby to prevent deterioration of image quality of a scanned image in the case of image scanning with entry of ambient light.

BRIEF DESCRIPTION OF THE DRAWINGS

Preferred embodiments of the present invention will be described hereinafter with reference to the drawings, in which.

DETAILED DESCRIPTION OF THE PREFERRED EMBODIMENTS

Embodiment 1

Figure 1A:
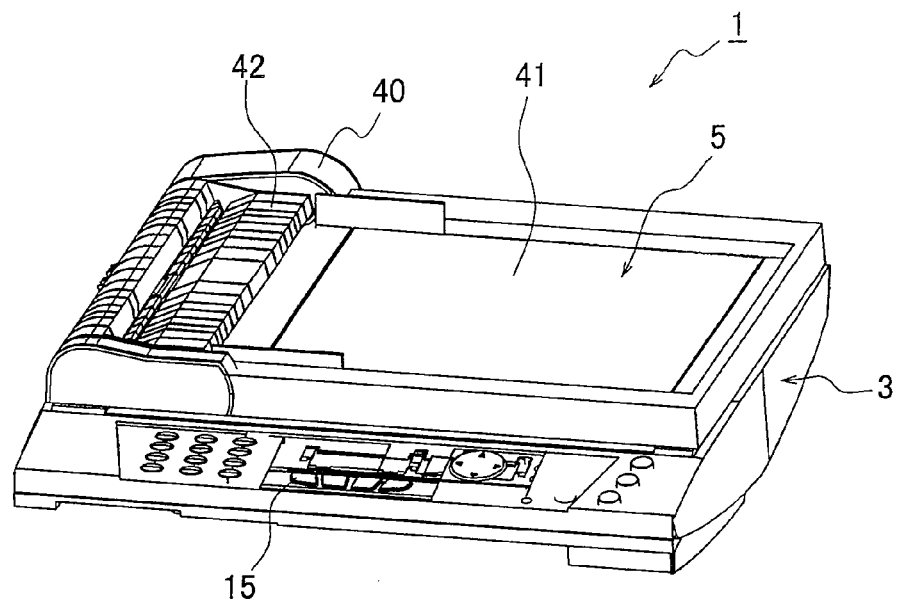
FIG. 1A is a perspective view showing a structure of an image scanner with a main body cover in a closed state.

(a) Referring to FIGS. 1A, 1B, 2, 3A and 3B, an entire structure of an image scanner 1 of Embodiment 1 will be described below.

The image scanner 1 of Embodiment 1 is configured as a flatbed type scanner provided with a main body cover 5 upwardly openable with respect to a scanner main body 3. The scanner main body 3 has a box shape with an opening in an upper portion thereof. An image sensor (a CIS) 21 is arranged within the scanner main body 3, so as to be reciprocable in a sub scanning direction (i.e., in the right and left directions in FIGS. 3A and 3B). A platen glass (a transparent plate) 13 is fixed with two-sided tape to an upper frame 20 of the scanner main body 3 having an opening so as to cover the opening. The platen glass 13, which is made of transparent glass or resin, has an upper surface constituting an original placing surface on which an original is placed.

The image scanner 1 may be embodied as part of a multifunction apparatus integrally provided with a scanner function, a printer function and a facsimile function. It is to be understood, however, that functions other than a scanner function are optional in the present invention, and that the present invention may be embodied as an exclusive scanner.

Figure 1B:
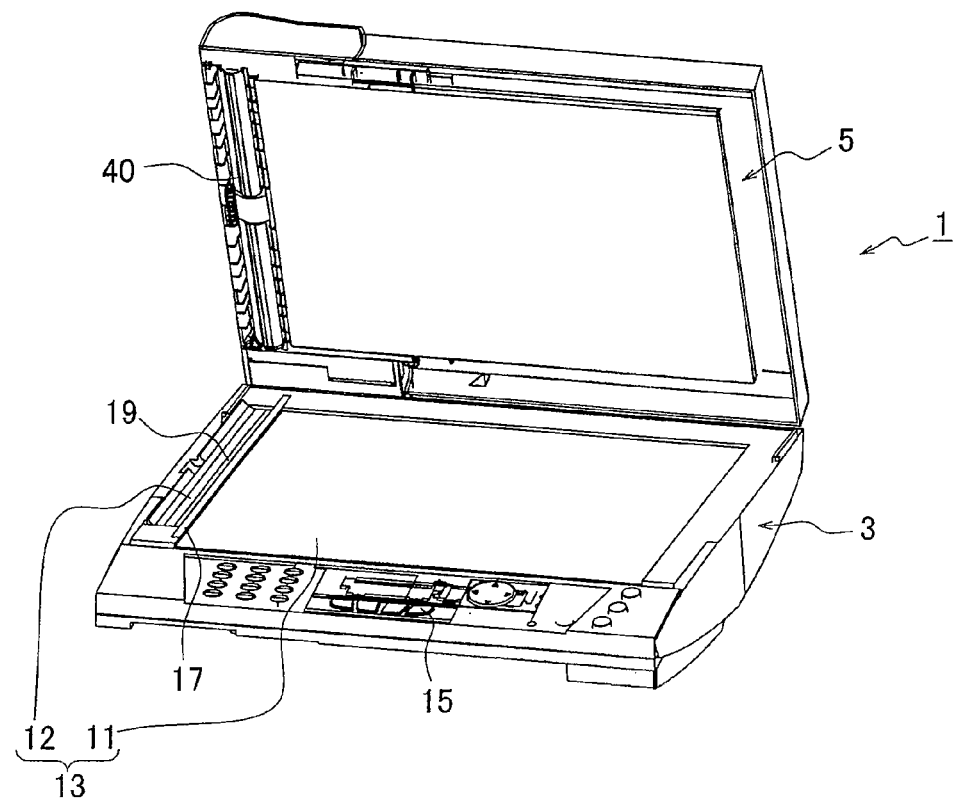
FIG. 1B is a perspective view showing a structure of the image scanner with the main body cover in a opened state.

The upper surface of the platen glass 13 can be covered with the main body cover 5 that is openable/closable in upper and lower directions with respect to a rear side of the scanner (an upper side in FIG. 2) as a rotation center. An original conveying device 40, provided on one end portion of the main body cover 5, can cover the platen glass 13 along with the main body cover 5. A pressing member, including sponge and a white plate, is disposed on an under surface of the main body cover 5 at a position corresponding to the platen glass 13. An original placed on the platen glass 13 is pressed by the pressing member. In FIG. 1A, the main body cover 5 is closed to cover the platen glass 13. In FIG. 1B, the main body cover 5 is opened to expose an entire area of the platen glass 13.

The scanner main body 3 is provided with an operating portion 15 including a variety of switches, such as a numeric keypad and others, and an LCD panel in a front portion (a lower side in FIG. 2) thereof. When a command is inputted by operating a key in the operating portion 15, the command is executed by an after-mentioned CPU 101. The image scanner 1 may be configured such that the image scanner 1 is connected to an external information device, such as a computer, and commands transmitted from software installed in the computer, such as a scanner driver, are executed by the CPU 101.

The upper frame 20 of the scanner main body 3 has an opening, and the platen glass 13 is fixed to the upper frame 20 so as to cover the opening.

Figure 3A:
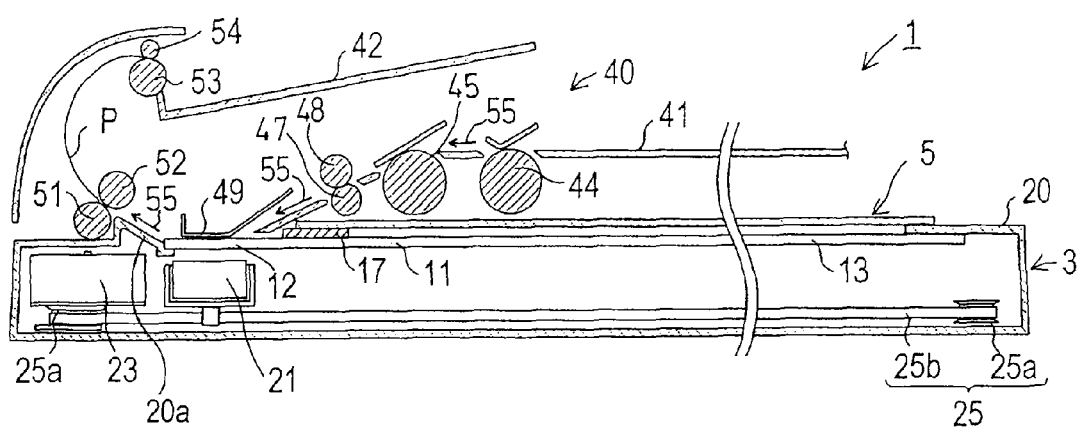
FIGS. 3A and 3B are diagrammatic cross-sectional views along a longitudinal direction of the image scanner.
Figure 3B:
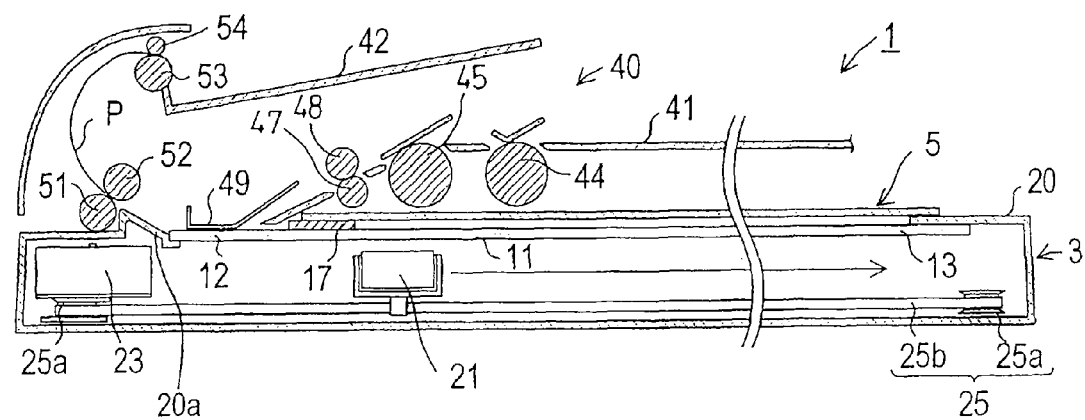

An image sensor 21 is arranged within the scanner main body 3, so as to be reciprocable in the sub scanning direction (i.e., in the right and left directions in FIGS. 3A and 3B). The image sensor 21 is positioned under the platen glass 13, while the original placing surface is the upper surface of the platen glass 13. In other words, the image sensor 21 is positioned opposite to the original placing surface with respect to the platen glass 13.

The image sensor 21 is a contact-type image sensor including point light sources (hereinafter referred to as the "light sources"), a SELFOC® lens, and a multiplicity of light receiving elements. The light sources are, for example, three colors of LEDs (R, G, and B), which irradiate light onto an original P on the platen glass 13. The SELFOC® lens is for focusing the reflected light onto the light receiving elements. The light receiving elements are arranged in a row at predetermined spacings so as to face upward. The length of the arranged light receiving elements in the image sensor 21 is approximately the same as a length of the platen glass 13.

In the scanner main body 3, a driving device is provided. The driving device includes a DC motor 23 arranged with its motor shaft oriented downward at one end of the scanner main body 3 in a longitudinal direction (i.e., in the sub scanning direction), a pulley 25a attached to the motor shaft, and a pulley 25a disposed at the other end of the scanner main body 3. The driving device further includes an endless belt 25b tensioned between these pulleys 25a. The driving device enables the image sensor 21 to move in a sub scanning direction (in the longitudinal direction of the scanner main body).

Accordingly, as described below, the image sensor 21 is configured to be reciprocable between a stationary original scanning area (a first scanning area) 11 and a moving original scanning area (a second scanning area) 12 of the platen glass 13.

Figure 2:
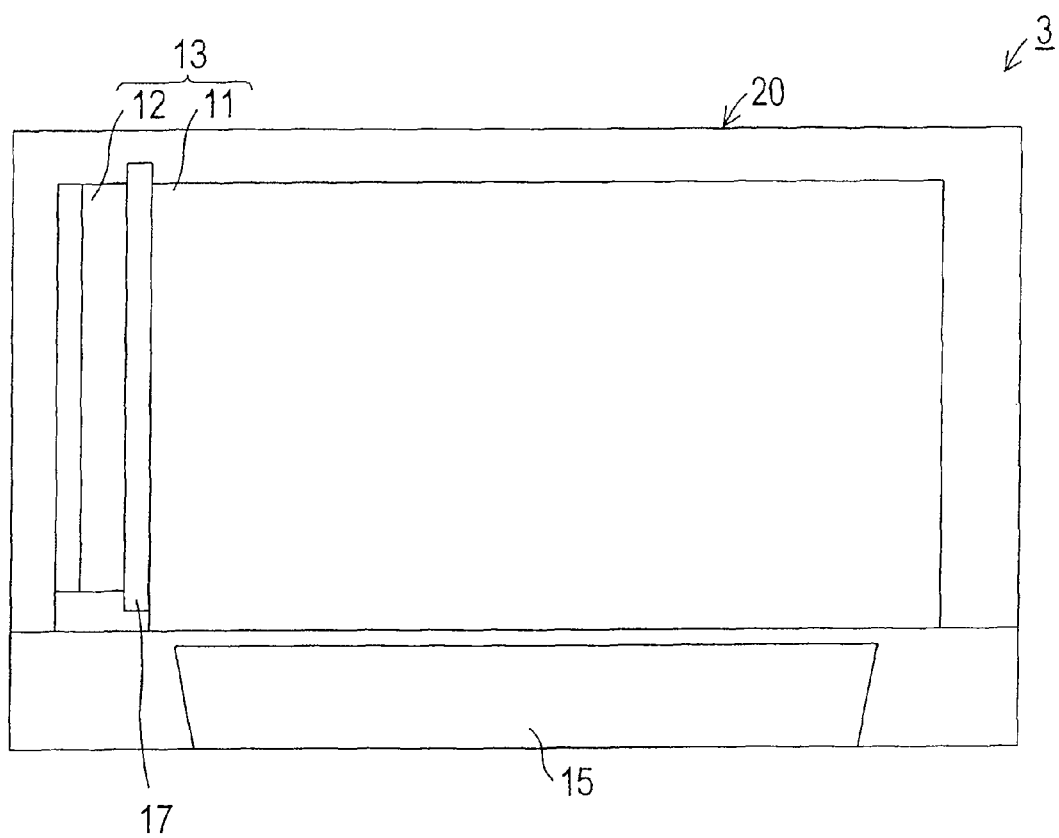
FIG. 2 is a plan view showing a structure of an upper portion of a scanner main body of the image scanner.

On the original placing surface side of the platen glass 13, a positioning member 17 is provided. The positioning member 17 divides the original placing surface of the platen glass 13 into a plurality of areas, i.e., the stationary original scanning area 11 and the moving original scanning area 12. The stationary original scanning area 11 is a surface on which an original P is placed when the image scanner is used as an FBS. The moving original scanning area 12 is a surface to scan an original P conveyed by using the original conveying device 40. As shown in FIG. 2, the platen glass 13 is divided into two areas by the positioning member 17, such that a narrow specific area is formed on a left side in the sub scanning direction of the image scanner 1 (i.e., in the right and left directions in FIG. 2) and a wide specific area is formed on a right side in the sub scanning direction on which an original P of a maximum scannable size can be placed. The narrow specific area on the left side is the stationary original scanning area 11, and the wide specific area on the right side is the moving original scanning area 12.

When the image scanner is used as an FBS, an original to be scanned P is placed facing down on the platen glass 13 in a state as shown in FIG. 1B. Specifically, the original P is placed with the surface to be scanned facing down on the stationary original scanning area 11 of the platen glass 13 using the positioning member 17 as an edge reference for the original P. The main body cover 5 is rotated downward around the rotation center so as to press the original P, as shown in FIG. 1A, and then image scanning of the original P is preformed. Specifically, as shown in FIG. 3B, the image sensor 21 fixed to the endless belt 25b irradiates light using the light sources while moving in a right direction of FIG. 3B due to the rotation of the DC motor 23. Reflected light from the original P is focused through the lens onto the light receiving elements, and light signals are converted into electrical signals.

As shown in FIGS. 3A and 3B, the original conveying device 40 (ADF) is mounted on the main body cover 5. The original conveying device 40 includes a paper feed tray 41, a paper exit tray 42, and a conveying path 55. The paper feed tray 41 is for loading the originals P with each surface to be scanned facing down. The paper exit tray 42 is provided above the paper feed tray 41 for stacking the originals P with each scanned surface facing up once scanning is completed. The conveying path is formed between the paper feed tray 41 and the paper exit tray 42 so as to define a reverse U-shaped turn. The paper feed tray 41 and the paper exit tray 42 are arranged to be shifted with each other in a horizontal direction so as to provide an open space over the paper feed tray 41. This leads to an advantage that the setting of the originals P on the paper feed tray 41 is easier as compared with a case of disposing the paper exit tray 42 right above the paper feed tray 41. By providing the paper feed tray 41 and the paper exit tray 42, originals P before and after the scanning can be held separately on the paper feed tray 41 and the paper exit tray 42.

The originals P, loaded on the paper feed tray 41, are drawn out by paper feed rollers 44 and 45, disposed substantially under the paper feed tray 41, and are conveyed downstream sheet by sheet. A set of rollers consisting of conveyer rollers 47 and 48 are disposed downstream from the paper feed rollers 44 and 45 for conveying the originals P toward the moving original scanning area 12 at the lowermost position. An upper plate 49 is disposed so as to face the moving original scanning area 12 of the platen glass 13 at a predetermined distance apart from the platen glass 13. The conveyed originals P are scanned sequentially by the image sensor 21 waiting under the moving original scanning area 12 (i.e., waiting at an ADF scanning position).

An ascending member 20a is provided near one end (a left end in FIG. 3) of the platen glass 13 so as to deflect the front end of each of the originals P that have moved on the platen glass 13. Each of the originals P is conveyed with a change in direction upward by a set of conveyer rollers 51 and 52, and is discharged by discharge rollers 53 and 54 on the paper exit tray 42 with a scanned surface facing up.

The configuration of the conveying device 40 is described as above only by way of example. It is to be understood that the configuration of the conveying device 40 may be modified into the configurations of other known conveying devices. For example, the relative positions of the paper feed tray 41 and the paper exit tray 42 may be changed. The configurations and arrangement of rollers, such as the paper feed rollers 44 and 45, the conveyer rollers 47 and 48, and the discharge rollers 53 and 54, as well as the conveying path 55 may also be changed.

Figure 5A:
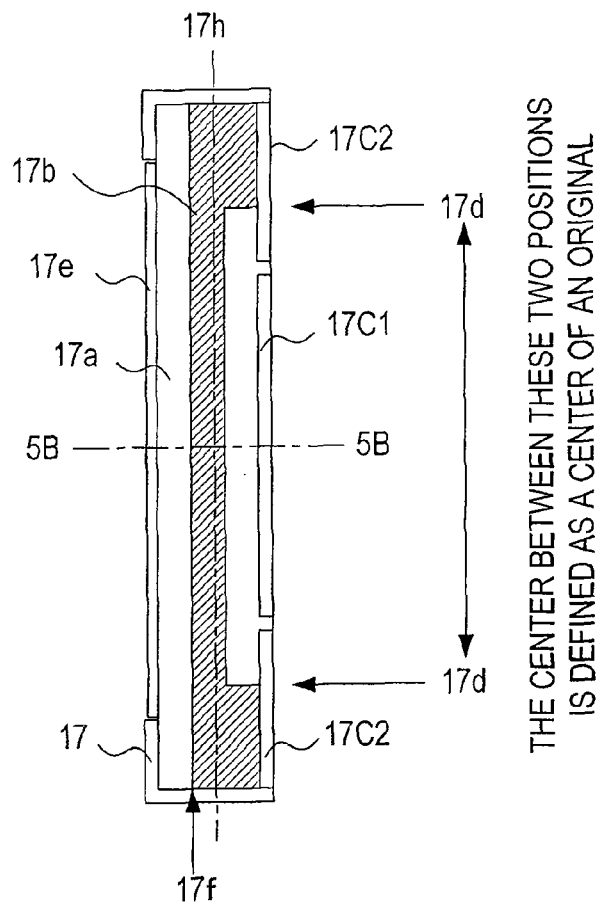
FIG. 5A is a plan view showing an under surface of a positioning member.

(b) The structure of the positioning member 17 will now be described with reference to FIGS. 5A and 5B. In FIG. 5A, showing an under surface (a glass abutting surface) of the positioning member 17, upper and lower directions indicate a main scanning direction and correspond to the upper and lower directions in FIG. 2. A left direction in FIG. 5A corresponds to the left direction in FIG. 2. Accordingly, a left side of the positioning member 17 corresponds to the moving original scanning area 12, while a right side of the positioning member 17 corresponds to the stationary original scanning area 11 in FIG. 5A.

The positioning member 17 is a substantially rectangular plate member having a length in the main scanning direction (i.e., in the upper and lower directions in FIG. 5A) the same as the length of the platen glass 13 in the main scanning direction. Accordingly, when the positioning member 17 is arranged on the platen glass 13 along the main scanning direction, as shown in FIG. 2, the positioning member 17 has enough length to extend from one end to the other end of the platen glass 13.

Substantially the entire under surface of the positioning member 17 is covered with a white reference portion 17a made of a white thin plate member. A black reference portion 17b, made of a black thin plate member, is attached onto the under surface of the white reference portion 17a. The black reference portion 17b is arranged such that approximately one third of the white reference portion 17a from a left end thereof is exposed without being covered with the black reference portion 17b. In other words, an area of approximately two thirds of the white reference portion 17a, starting from a position of approximately one third of the white reference portion 17a on the side of the moving original scanning area 12 toward the right direction (toward the stationary original scanning area 11), is covered with the black reference portion 17b.

The above area of the white reference portion 17a exposed without being covered with the black reference portion 17b is used for obtaining the after-mentioned white reference data and for light amount adjustment. A center part of an area of the black reference portion 17b, corresponding to approximately one third of the white reference portion 17a on the right side, is cut out, and thereby the white reference portion 17a is exposed therein. A line defined by a left end 17f of the black reference portion 17b, that is, a boundary between the white reference portion 17a and the black reference portion 17b, is a reference position for the sub scanning of the image sensor 21. Specifically, a home position HP (a waiting position) is determined based on the left end 17f at the time of initialization when the power is turned on and after completion of scanning.

By cutting out the center part of the black reference portion 17b on the right side, two boundaries between the white reference portion 17a and the black reference portion 17b in the main scanning direction are provided. These two boundaries are used as reference positions 17d in the main scanning of the image sensor 21. In the image scanner 1 of Embodiment 1, the center between the two reference positions 17d is defined as a center of each of the originals P.

At each of the above reference positions 17d and 17f, there is a clear change in color (brightness) between the white color of the white reference portion 17a and the black color of the black reference portion 17b. Accordingly, the reference positions 17d and 17f can be definitely determined based on outputs of the image sensor 21.

An area of the black reference portion 17b extending in the main scanning direction of the image sensor 21, that is, an area around a center of the positioning member 17 in the sub scanning direction of the image sensor 21, is used for obtaining the after-mentioned black reference data. The obtainment of the black reference data is performed not over an entire width of the black reference portion 17b in the sub scanning direction, but at a position 17h corresponding to a main scanning line along which the light receiving elements are aligned. A width of the black reference portion 17b around the center thereof is sufficiently wide for the position 17h. The black reference portion 17b at least extends out to the left side, toward the moving original scanning area 12 from the position 17h. The black reference portion 17b may, of course, extend out to the right side, toward the stationary original scanning area 11 from the position 17h.

A clear two-sided tape 17c is applied to a right end area of the under surface of the positioning member 17. The two-sided tape 17c consists of a thick two-sided tape 17c1 applied to a center portion in the upper and lower directions in FIG. 5A and thin two-sided tapes 17c2 applied to an upper end portion and an lower end portion in FIG. 5A. A thickness difference between the two-sided tape 17c1 and the two-sided tape 17c2 corresponds to a thickness difference between the white reference portion 17a and the black reference portion 17b. The white reference portion 17a is cut off in accordance with the shape of the two-sided tape 17c1 in an area at which the two-sided tape 17c1 is applied. That is, the two-sided tape 17c1 is applied directly to the positioning member 17. On the contrary, the two-sided tapes 17c2 are applied to the white reference portion 17a and the black reference portion 17b.

Figure 5B:
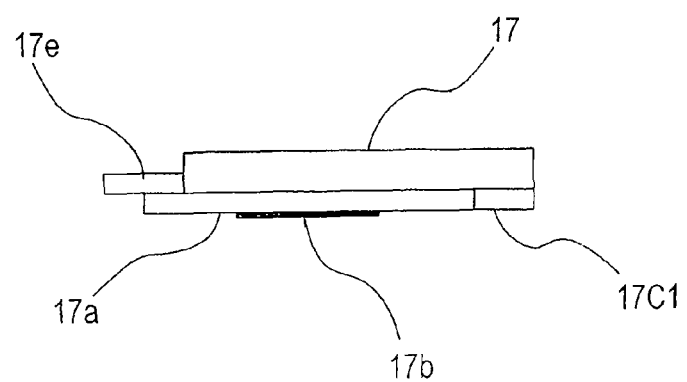
FIG. 5B is a cross-sectional view taken along line 5B-5B in FIG. 5A.

As shown in FIG. 5B, a left end of the white reference portion 17a includes an extending portion which extends further from the positioning member 17 in a left direction. A clear tape 17e is applied to an upper surface of the extending portion. The clear tape 17e has a right end fixed to the positioning member 17 and a left end extending further from the white reference portion 17a in the left direction.

As described above, the white reference portion 17a and the black reference portion 17b are arranged on the under surface of the positioning member 17, and the positioning member 17 is fixed to the upper surface of the platen glass 13 in close contact with each other with the two-sided tapes 17c1, 17c2 and the two-side tape 17e. That is, the white reference portion 17a and the black reference portion 17b are arranged on the original placing surface side of the positioning member 17. Accordingly, the white reference portion 17a is arranged on the original placing surface side of the positioning member 17 and on the side of the moving original scanning area 12. The black reference portion 17b is arranged on the original placing surface side of the positioning member 17 and around the center of the positioning member 17 in the sub scanning direction of the image sensor 21.

Figure 4:
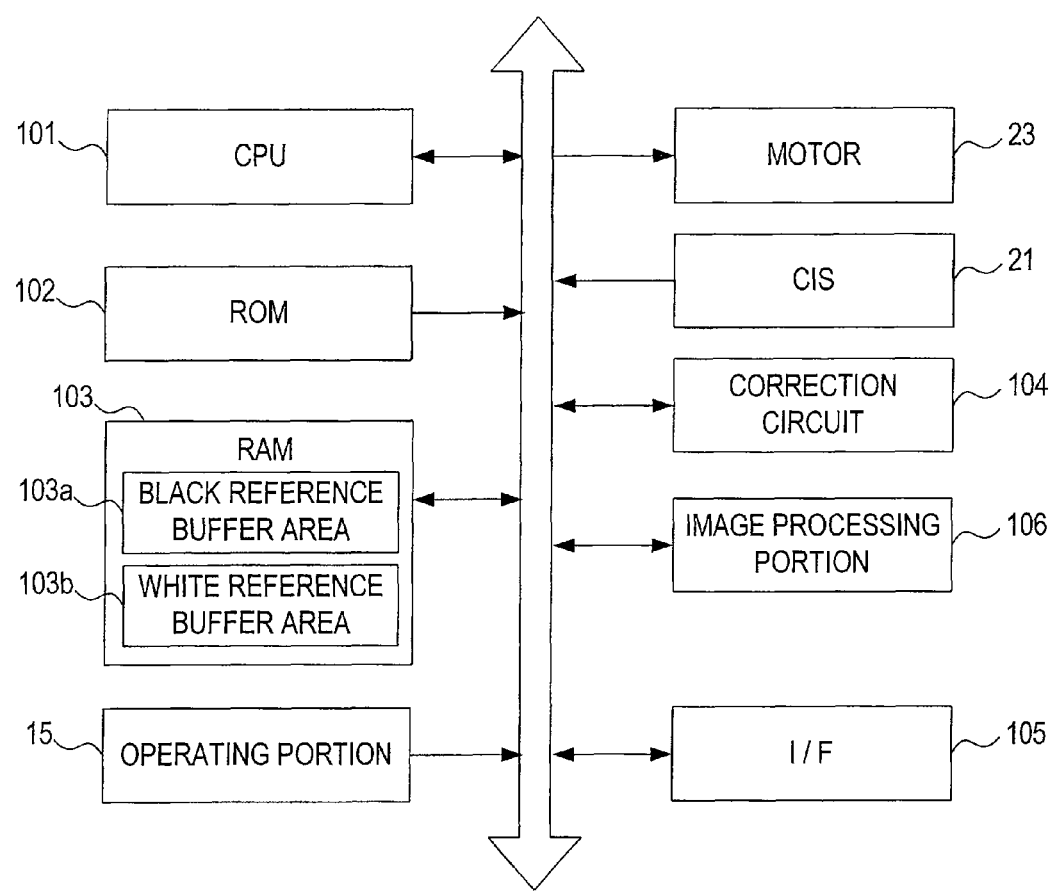
FIG. 4 is a block diagram showing an electrical structure of the image scanner.

(c) An electrical structure of the image scanner 1 will be described hereinafter with reference to FIG. 4. A CPU 101 performs control of various components in the image scanner 1, such as control of forward/reverse rotation of the motor 23, control of speed, and control of the turning on/off of the light sources provided in the image sensor 21, based on control programs stored in a ROM 102. The ROM 102 stores programs for controlling the image scanner 1.

A RAM 103 is a memory for temporarily storing image data scanned by the image sensor 21 and image data from a PC connected to the image scanner 1. The RAM 103 includes at least a black reference buffer area 103a that stores black reference data for correcting gradient properties among the light receiving elements, and a white reference buffer area 103b that stores white reference data for correcting variation in light amount among the light sources.

A correction circuit 104 performs processes, such as black correction, white correction, and gamma correction, line by line with respect to colors R, G, and B. Specifically, various corrections such as shading correction are performed on image data of an original P scanned by the image sensor 21.

An image processing portion 106 performs processes, such as smoothing and emphasizing of corrected image data, converting RGB data into printable Cyan-Magenta-Yellow-Black (CMYK) data, and others.

(d) Processes performed by the CPU 101 of the image scanner 1 will now be described with reference to FIGS. 6-10.

Figure 6:
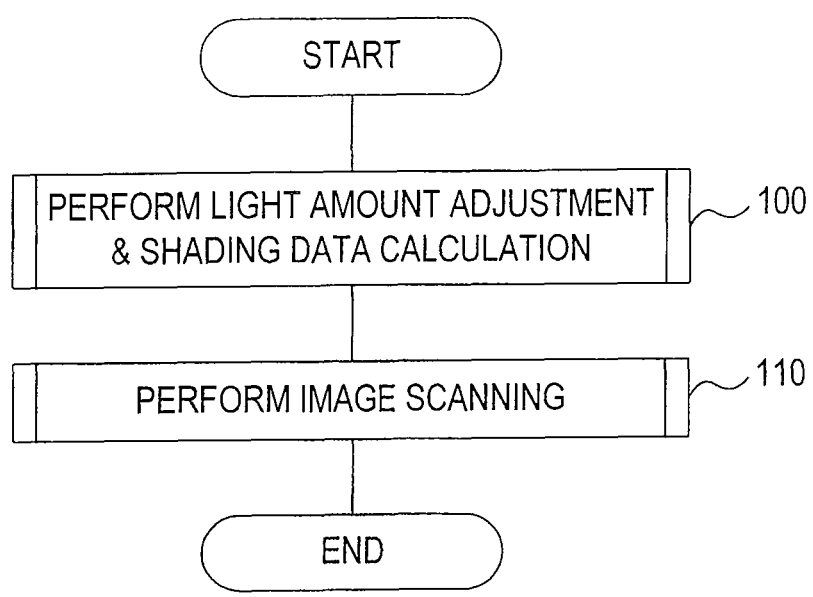
FIG. 6 is a flowchart for illustrating an image scanning process performed by the image scanner.

First, processes performed by the CPU 101 will be described schematically using the flowchart in FIG. 6. In Step 100, the CPU performs light amount adjustment and shading data calculation. This process will be described in detail later.

In Step 110, the CPU 101 performs scanning of an original P and generates an image signal.

Scanning of the original P placed on the stationary original scanning area 11 of the platen glass 13 is performed as described below. The CPU 101 controls the motor 23 and simultaneously makes the image sensor 21 scan the original P placed on the stationary original scanning area 11. That is, the CPU 101 makes the image sensor 21 scan the original P, while moving the image sensor 21.

Scanning of an original P conveyed by the original conveying device 40 is performed as described below. The CPU 101 fixes the image sensor 21 under the moving original scanning area 12. Then, the CPU 101 controls the original conveying device 40 to convey an original P, placed on the paper feed trays 41, toward the original scanning area 12. While the original P passes through the original scanning area 12, the CPU 101 makes the image sensor 21 scan the original P.

An image signal output by the image sensor 21, which has scanned the original P, is digitized by an internal circuit. Well-known shading correction or the like is performed on the digitized image signal by the correction circuit 104, based on shading data created and updated as described later. The image signal after the shading correction is stored once in the RAM 103, and then is provided to an external personal computer or an image forming device through an interface 105 by an operation of the CPU 101.

Second, a process of light amount adjustment and shading data calculation performed by the CPU 101 will be described using FIGS. 7, 9 and 10.

(Light Amount Adjustment and Shading Data Calculation Process 1)

Before this process is started, the image sensor 21 is located at a home position HP. The home position HP is a waiting position which is closer to the white reference portion 17a than to the black reference portion 17b (see FIG. 10). The waiting position is determined based on the reference position 17f in the sub scanning direction shown in FIG. 5A.

Specifically, when the power is turned on, the CPU 101 makes the image sensor 21 scan the reference position 17f while moving under the positioning member 17 with the light sources on. Since the reference position 17f is a boundary between the white color and the black color, outputs of the light receiving elements change due to changes in the reflected lights from these colors. The CPU 101 determines the reference position 17f based on output changes of the image sensor 21. Then the image sensor 21 is moved to a waiting position which is determined as a position at a specified distance apart from the reference position 17f toward the exposed area of the white reference portion 17a, i.e., toward the moving original scanning area 12 (a waiting step). The waiting position is preferably located in the vicinity of the positioning member 17 with the object of speeding up the light amount adjustment and the obtainment of corrected data.

Figure 7:
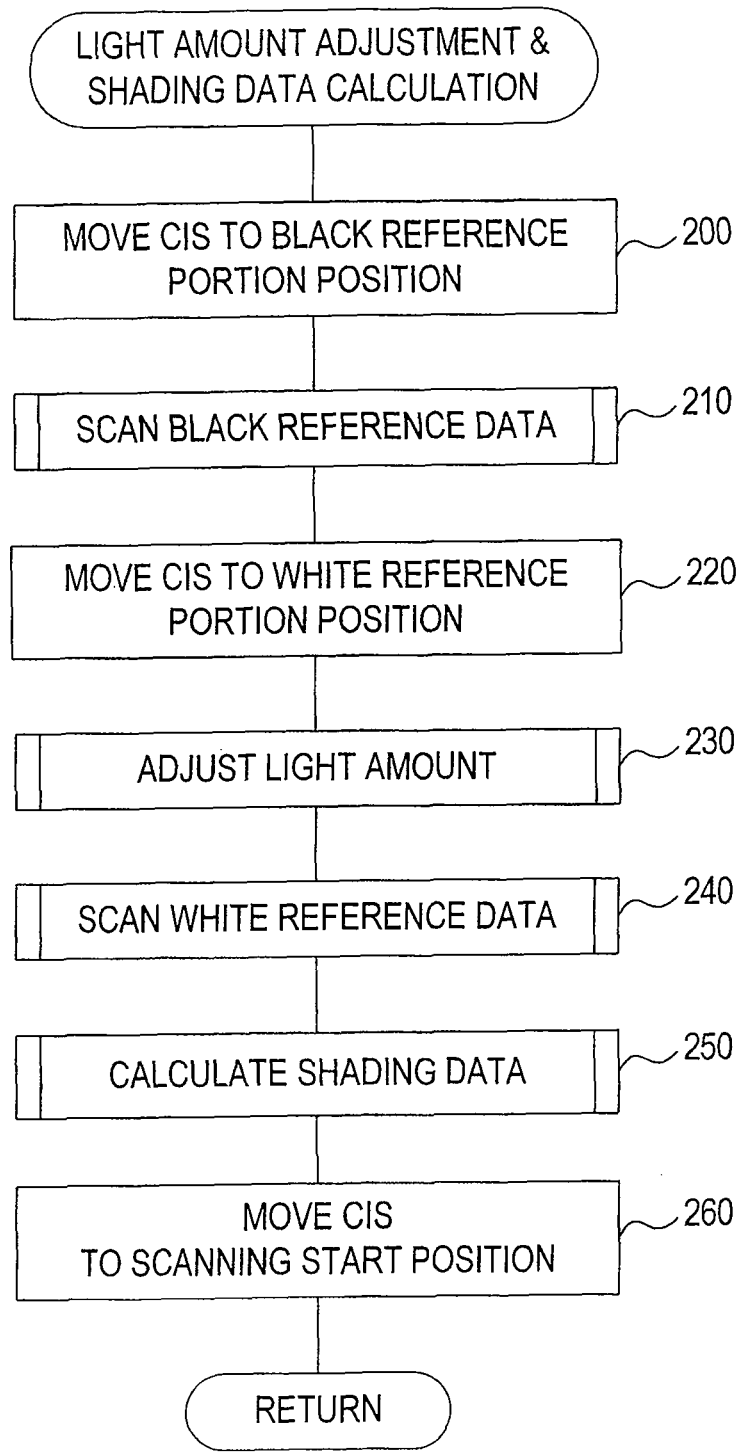
FIG. 7 is a flowchart for illustrating a first process of light amount adjustment and shading data calculation.
Figure 9A:
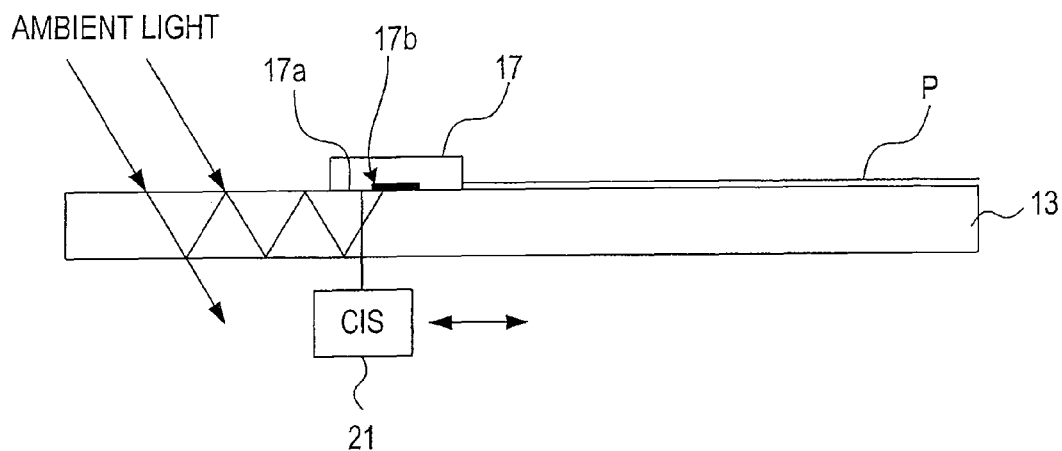
FIGS. 9A and 9B are explanatory views showing a structure around a platen glass in Embodiment 1.
Figure 9B:
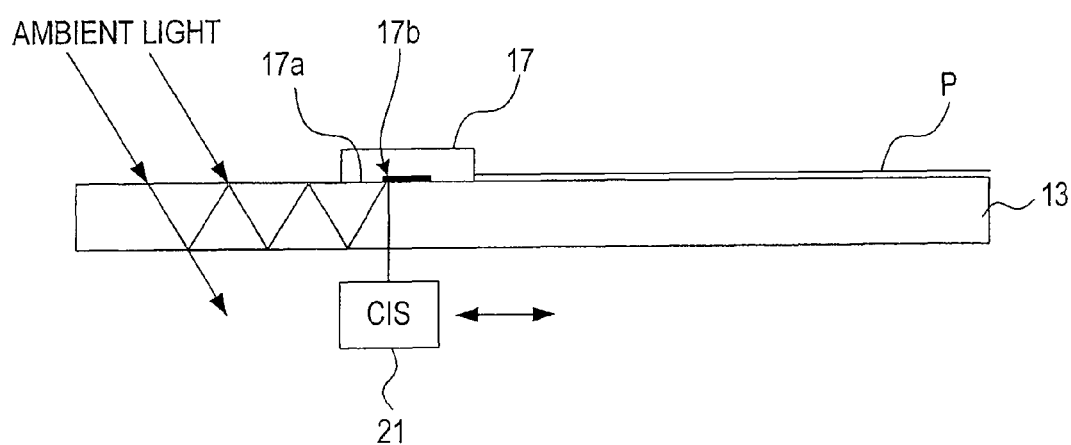

In Step 200 in FIG. 7, when the start button in the operating portion 15 is pressed down, the motor 23 is rotated by a command issued by the CPU 101. Then, the image sensor 21 starts to move away from the home position HP, in order to obtain black reference data and white reference data. After a movement of a specific distance from the home position HP, the image sensor 21 stops under the black reference portion 17b (the movement from (1) HP to (2) black reference portion in FIG. 10). After the movement, the image sensor 21 is positioned right under the black reference portion 17b, as shown in FIG. 9B.

In Step 210 (a black reference data obtaining step), black reference data is obtained. Specifically, scanning of the black reference portion 17b is performed a plurality of times with the light sources of the image sensor 21 turned off. Then, the obtained data is divided by the number of times the scanning was performed with respect to each of the light receiving elements in order to calculate an average, and the average data is stored in the black reference buffer area 103a of the RAM 103 as the black reference data.

Figure 10:
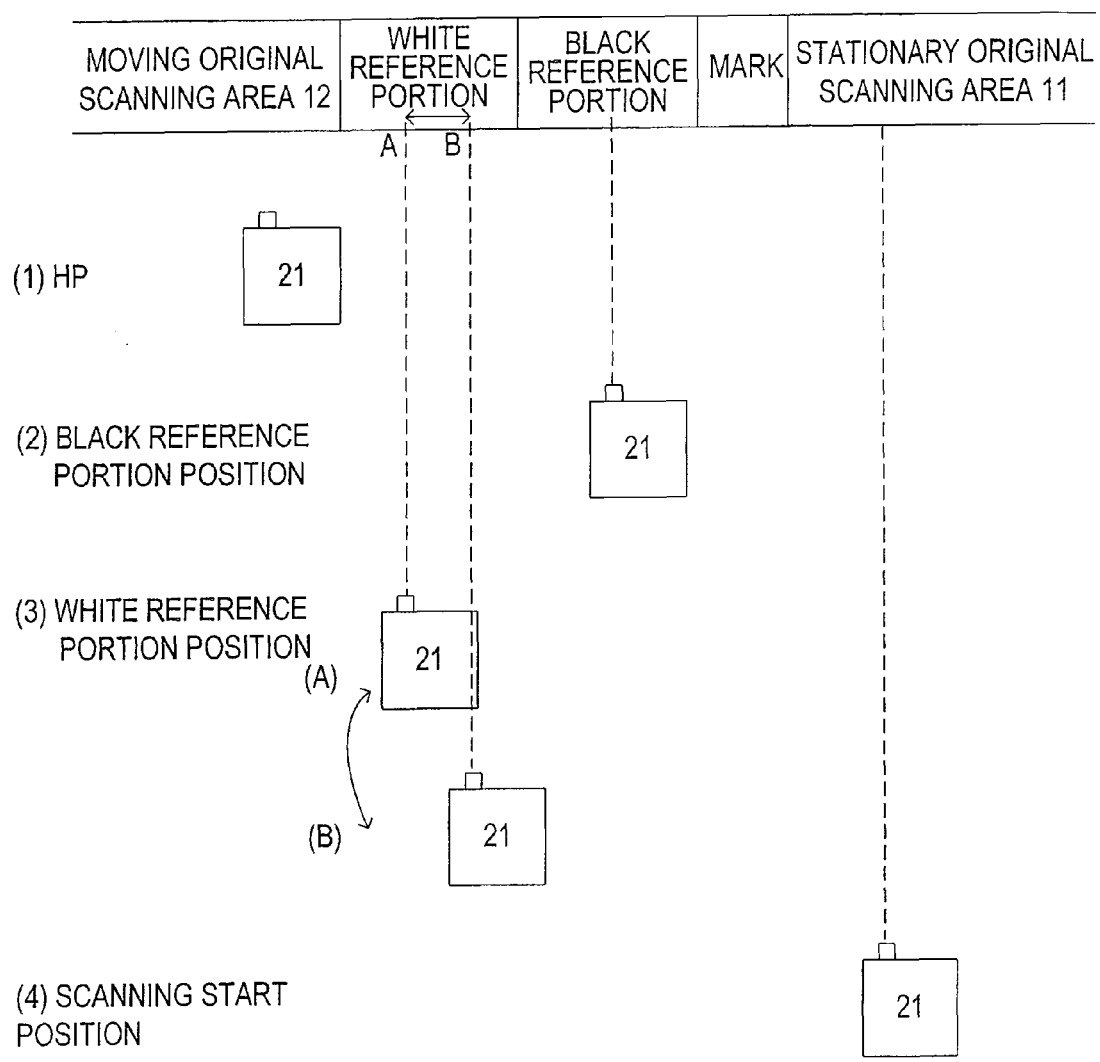
FIG. 10 is an explanatory view showing an operation of an image sensor during the first process of light amount adjustment and shading data calculation.

In Step 220, upon storing the black reference data, the motor 23 is driven again to move the image sensor 21 by a predetermined distance to a position under the white reference portion 17a (the movement from (2) BLACK REFERENCE PORTION to (3) WHITE REFERENCE PORTION in FIG. 10).

In Step 230, light adjustment for the white reference portion 17a is performed. Specifically, first, light with a sufficiently small light amount is irradiated to the white reference portion 17a from the light sources of the image sensor 21, and the reflected light is scanned by the light receiving elements. When the light amount of the light sources is small, the output of the light receiving elements is accordingly small. The light amount is increased in a stepwise or continuous manner until the output of the light receiving elements reaches a desired value. The light amount when the output of the light receiving elements reaches the desired value is store in the RAM 103 as an adjusted light amount value. The desired value of the output of the light receiving elements is determined such that the output of white reference data against black reference data gives a desired value.

In Step 240 (a white reference data obtaining step), the image sensor 21 scans the white reference portion 17*a*. Specifically, light with the adjusted light amount value is irradiated to the white reference portion 17*a* from the light sources of the image sensor 21, and the reflected light from the white reference portion 17*a* is scanned by the light receiving elements. Thus, white reference data is obtained.

In this process, the CPU 101 rotates the motor 23 in forward and reverse directions, thereby to reciprocate the image sensor 21 under the white reference portion 17*a*. The range of reciprocation is between a point A corresponding to a position 1 mm from a left end of the white reference portion 17*a* and a point B corresponding to a position 1 mm from a right end of the white reference portion 17*a* (see (3) WHITE REFERENCE PORTION in FIG. 10). During the reciprocation, the light receiving elements obtain a plurality of pieces of data at different positions in the white reference portion 17*a*. The obtained plurality of pieces of data are divided by the number of times of scanning with respect to each of the light receiving elements, and are stored in the white reference buffer area 103*b* of the RAM 103 as white reference data.

In Step 250, the CPU 101 creates black shading data by using the black reference data obtained in Step 210, while creating white shading data by using the white reference data obtained in Step 240. The created shading data of each color is stored in the RAM 103.

The created shading data of each color is also used for shading correction of the image signal. The created shading data of each color is updated each time it is newly created.

In Step 260, the CPU 101 moves the image sensor 21 to a scanning start position. In the case of scanning an original conveyed by the original conveying device 40, the scanning start position is the ADF scanning position shown in FIG. 3A. In the case of scanning an original placed on the stationary original scanning area 11, the scanning start position is under the left end of the stationary original scanning area 11, as shown in FIG. 3B and indicated by (4) SCANNING START POSITION) in FIG. 10. Subsequently, as described above, image scanning of an original P is performed by irradiating light to the original P from the light sources of the image sensor 21 and by scanning the reflected light by the light receiving elements.

(e) Advantages provided by the image scanner 1 of Embodiment 1 and an image scanning method using the image scanner 1 will be described below.

i) According to the image scanner 1 of Embodiment 1, the black reference data is obtained while the image sensor 21 is under the black reference portion 17*b*. Since the black reference portion 17*b* on the side of the original placing surface (i.e., on the under surface) of the positioning member 17. Accordingly, if an instruction to perform image scanning is provided while the main body cover 5 is opened, that is, while the stationary original scanning area 11 and the moving original scanning area 12 are exposed, ambient light is likely to enter. Particularly when a thick original P is to be scanned using the image scanner 1 as an FBS, it is difficult to completely close the main body cover 5. Also, since the original P is not placed on the moving original scanning area 12, ambient light is further likely to enter.

Such ambient light that has entered the side of the original placing surface of the positioning member 17 is absorbed by the black reference portion 17*b*. Accordingly, ambient light that has entered the black reference portion 17*b* will not be reflected to the image sensor 21. Then, obtainment of black reference data is performed with respect to the black reference portion 17*b* with the light sources of the image sensor 21 turned off, and accurate black reference data can be obtained without an influence of ambient light. It is, therefore, possible to obtain black reference data with a clear gradation and to perform accurate shading correction in the image scanner 1 of Embodiment 1.

ii) In Embodiment 1, the white reference portion 17*a* and the black reference portion 17*b* are arranged on the side of the original placing surface of (on the under surface of) the positioning member 17, and the positioning member 17 is arranged on the upper surface of the original placing surface of the platen glass 13. Accordingly, the white reference portion 17*a* and the black reference portion 17*b* are arranged on the upper surface of the original placing surface of the platen glass 13.

As a result, either of the distance between the image sensor 21 and the white reference portion 17*a*, and the distance between the image sensor 21 and the black reference portion 17*b*, is the same as the distance between the image sensor 21 and an original P placed on the platen glass 13. In other words, white reference data obtained with respect to the white reference portion 17*a* and black reference data obtained with respect to the black reference portion 17*b* is based on the same conditions as in the obtainment of image data of the original P. It is, therefore, possible to obtain accurate white reference data by using the white reference portion 17*a* and accurate black reference data by using the black reference portion 17*b* in the image scanner 1 of Embodiment 1.

iii) In Embodiment 1, as shown in FIGS. 5A and 5B, the white reference portion 17*a* and the black reference portion 17*b* are adjacent to each other. Accordingly, the moving distance of the image sensor 21 can be reduced when the image sensor 21 is moved from under the white reference portion 17*a* to under the black reference portion 17*b*, or vice versa. This leads to a shortened time interval between the obtainment of white reference data and the obtainment of black reference data. It is, therefore, possible to create the shading data in a short time.

iv) In Embodiment 1, as shown in FIGS. 5A and 5B, the black reference portion 17*a* is arranged so as to extend from the center of the positioning member 17 in the sub scanning direction of the image sensor 21 toward the moving original scanning area 12. Accordingly, the black reference portion 17*b* may have a sufficient area from the position 17*h*, at which black reference data is obtained, toward the moving original scanning area 12 through which ambient light is likely to enter. It is, therefore, possible to further surely absorb, by means of the black reference portion 17*b*, ambient light which enters from the moving original scanning area 12, is reflected in the platen glass 13, or passes through the platen glass 13 and is reflected in the housing, and enters the side of the original placing surface of the positioning member 17.

v) In Embodiment 1, the length of the black reference portion 17*b* in the main scanning direction is larger than the length of the platen glass 13 in the main scanning direction. That is, the black reference portion 17*b* extends from one end to the other end of the platen glass 13. Accordingly, the black reference portion 17b can sufficiently absorb ambient light traveling through the platen glass 13.

vi) In Embodiment 1, white reference data is obtained at a plurality of positions in the white reference portion 17a while the image sensor 21 is reciprocated. Accordingly, even if dust is attached to a part of the white reference portion 17a, the influence of the dust can be reduced. Thus, accurate white reference data can be obtained.

vii) In Embodiment 1, the image sensor 21 obtains a plurality of pieces of black reference data. Accordingly, accurate black reference data can be obtained without being influenced by variations in black reference data.

viii) In Embodiment 1, when (Light Amount Adjustment and Shading Data Calculation Process 1) (see FIG. 7) is selected, black reference data is obtained first, and then white reference data is obtained. This facilitates the easy creation of shading data.

(Process of Light Amount Adjustment and Shading Data Calculation 2)

In Embodiment 1, an alternative process of light amount adjustment and shading data calculation may be performed. The alternative process will be described below with reference to FIGS. 8, 9 and 11.

Before the process is started, the image sensor 21 is located at the home position HP. The method of making the image sensor 21 wait at a waiting position (a waiting step) is the same as described above.

Figure 8:
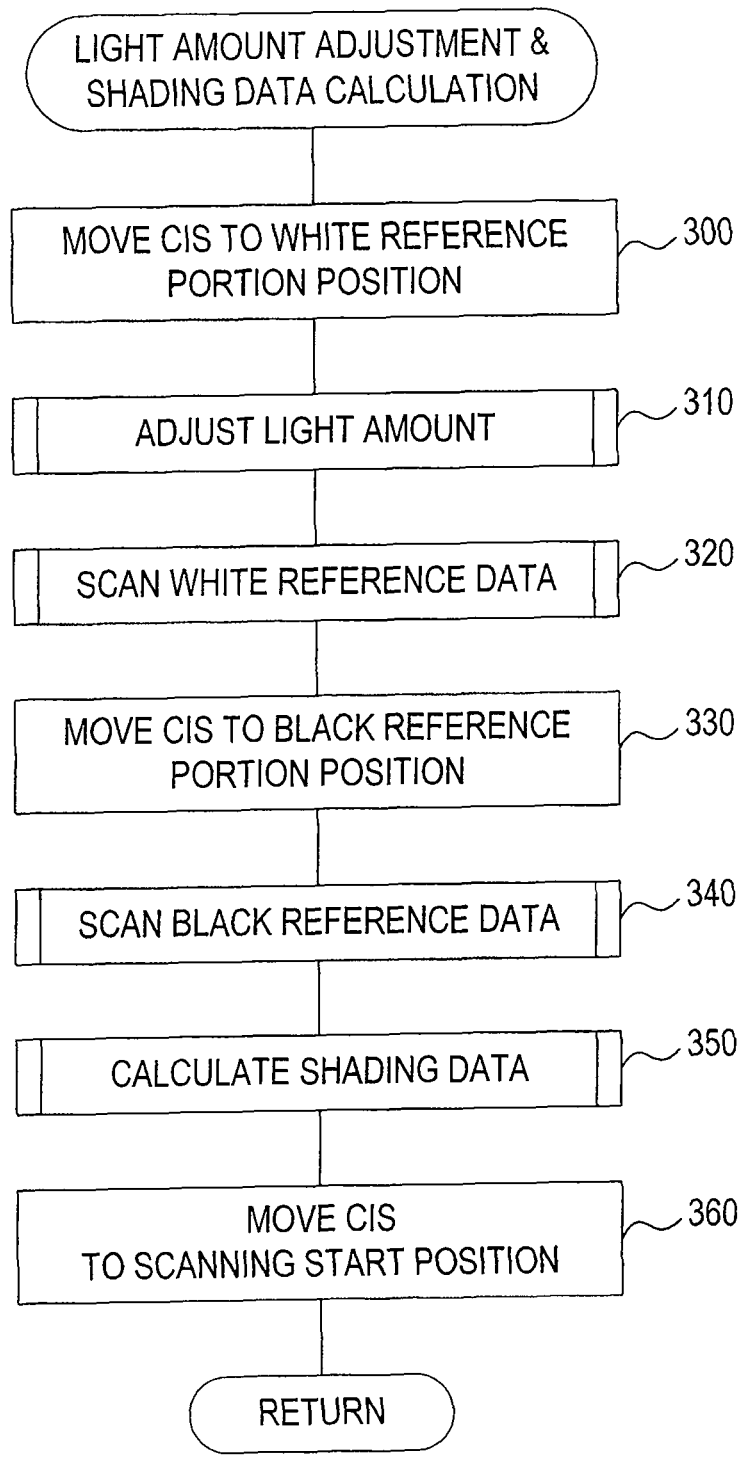
FIG. 8 is a flowchart for illustrating a second process of light amount adjustment and shading data calculation.

In Step 300 in FIG. 8, when the start button in the operating portion 15 is pressed down, the motor 23 is rotated by a command issued by the CPU 101. Then, the image sensor 21 starts to move away from the home position HP in order to obtain black reference data and white reference data. After a movement of a specific distance from the home position HP, the image sensor 21 stops under the white reference portion 17a (the movement from (1) HP to (2) WHITE reference portion in FIG. 11). After the movement, the image sensor 21 is positioned under the white reference portion 17a as shown in FIG. 9A.

In Step 310, the CPU 101 adjusts the light amount of the light sources of the image sensor 21 to be suitable for subsequent capturing of white reference data. Although this light amount adjustment is the same as the light amount adjustment shown in Step 230, black reference data has not yet been obtained. Prior to obtainment of black reference data, however, black reference data previously obtained at the previous image scanning is stored in the black reference buffer area 103a of the RAM 103. Therefore, light amount adjustment is performed based on the previously obtained black reference data such that white reference data has a desired output.

In Step 320 (a white reference data obtaining step), the image sensor 21 scans the white reference portion 17a. In this case, the motor 23 is rotated in forward and reverse directions, thereby to reciprocate the image sensor 21 under the white reference portion 17a. The range of reciprocation is between a point A corresponding to a position 1 mm from a left end of the white reference portion 17a and a point B corresponding to a position 1 mm from a right end of the white reference portion 17a (see (2) WHITE REFERENCE PORTION in FIG. 11). During the reciprocation, the light receiving elements of the image sensor 21 obtain a plurality of pieces of data at different positions in the white reference portion 17a. The obtained plurality of pieces of data are divided by the number of times of scanning with respect to each of the light receiving elements, and are stored in the white reference buffer area 103b of the RAM 103 as white reference data.

Figure 11:
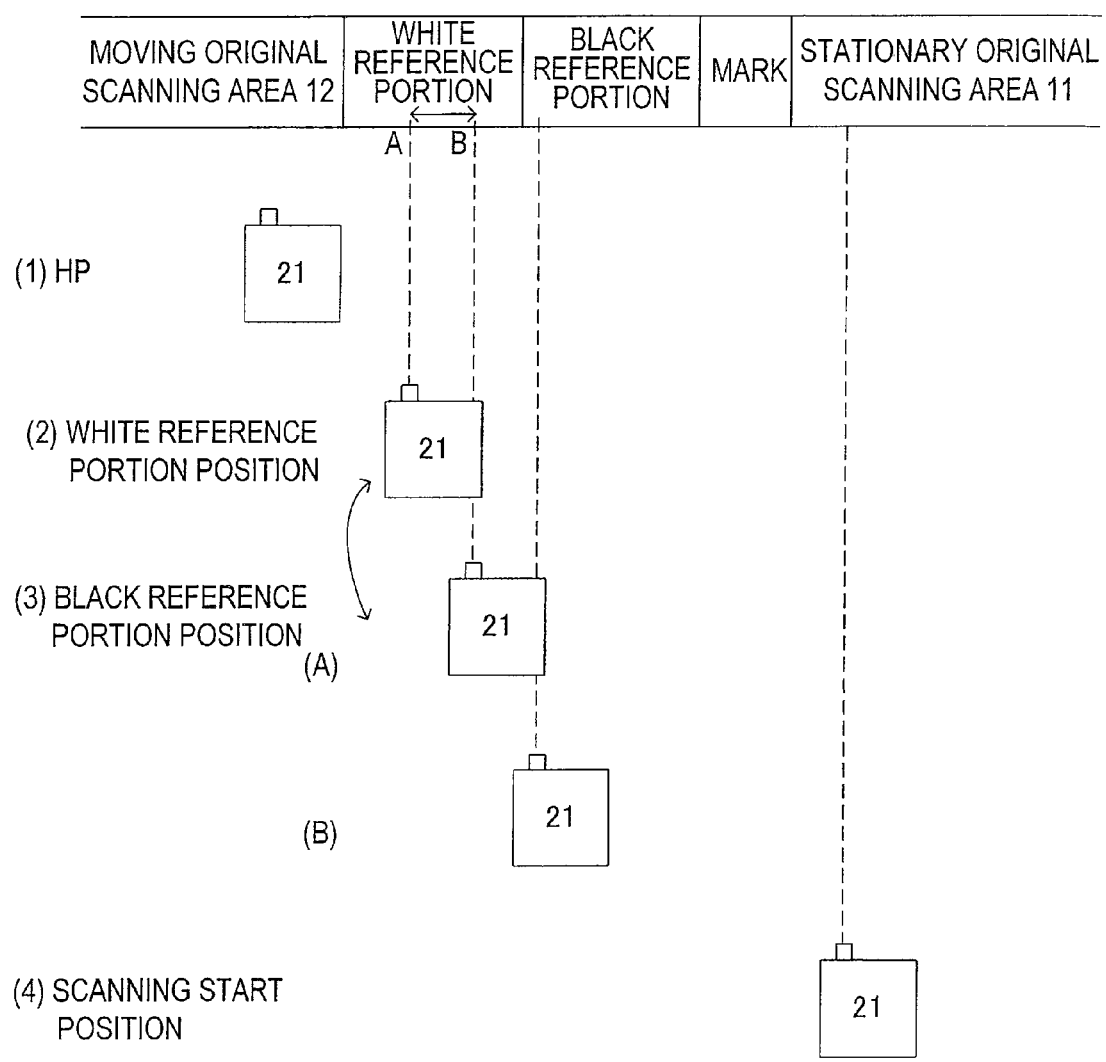
FIG. 11 is an explanatory view showing an operation of the image sensor during the second process of light amount adjustment and shading data calculation.

In Step 330, the CPU 101 moves the image sensor 21 from a position under the white reference portion 17a to a position under the black reference portion 17b (the movement from (2) WHITE REFERENCE PORTION to (3) BLACK REFERENCE PORTION in FIG. 11). After the movement, the image sensor 21 is positioned right under the black reference portion 17b, as shown in FIG. 9B. The CPU 101 turns off the light sources of the image sensor 21 by the time the image sensor has reached a position under the black reference portion 17b.

In Step 340 (a black reference obtaining step), scanning is performed a plurality of times with the light sources of the image sensor 21 turned off in order to scan black reference data. Then, the obtained data is divided by the number of times the scanning was performed with respect to each of the light receiving elements in order to calculate an average, and the average data is stored in the black reference buffer area 103a of the RAM 103 as black reference data.

In Step 350, the CPU 101 creates black shading data by using the black reference data obtained in Step 340, while creating white shading data by using the white reference data obtained in Step 320. The created shading data of each color is stored in the RAM 103.

In Step 360, the CPU 101 moves the image sensor 21 to a scanning start position. In the case of scanning an original conveyed by the original conveying device 40, the scanning start position is the ADF scanning position shown in FIG. 3A. In the case of scanning an original placed on the stationary original scanning area 11, the scanning start position is under a left end of the stationary original scanning area 11 as shown in FIG. 3B and indicated by (4) SCANNING START POSITION in FIG. 11. Subsequently, as described above, image scanning of an original P is performed by irradiating light to the original P from the light sources of the image sensor 21 and by scanning the reflected light by the light receiving elements.

When (Light Amount Adjustment and Shading Data Calculation Process 2) (see FIG. 8) is selected in Embodiment 1, the image sensor 21 moves in one direction from the home position through the position under the white reference portion 17a to the position under the black reference portion 17b. This leads to a shortened moving distance of the image sensor 21, and thereby to a reduced time required for the creation of shading data.

Embodiment 2

The structure and operation of an image scanner 1 in Embodiment 2 are basically the same as in Embodiment 1.

Figure 12:
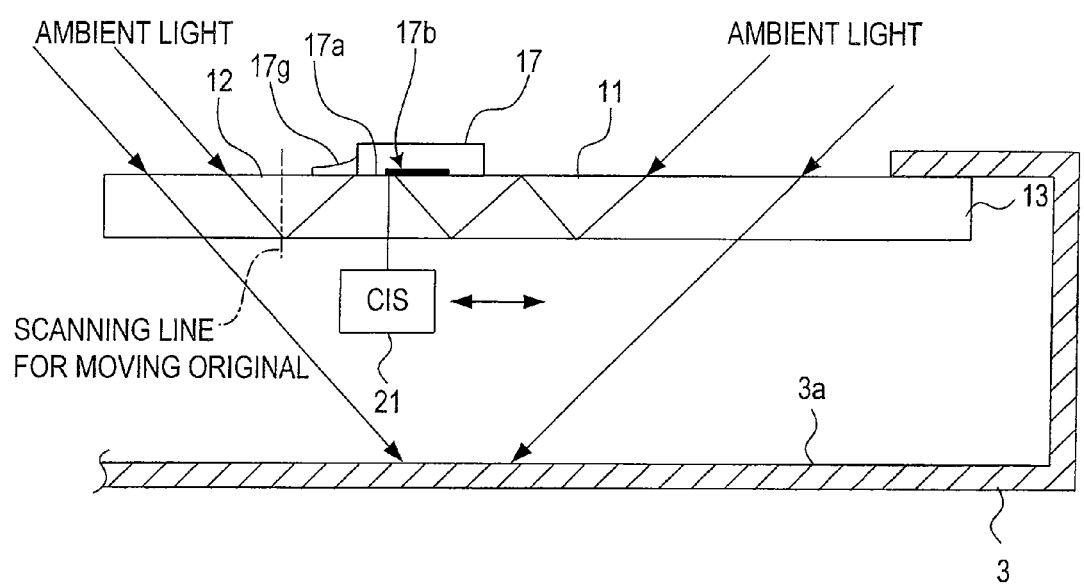
FIG. 12 is an explanatory view showing a structure around the platen glass in Embodiment 2.

In Embodiment 2, however, a light absorbing portion 17g is provided to the positioning member 17 on a side of the moving original scanning area 12, as shown in FIG. 12. The light absorbing portion 17g is a plate-like member having a horizontal under surface and a sloping upper surface lowered toward the outside. The under surface of the light absorbing portion 17g is level with the white reference portion 17a, the black reference portion 17b and a mark portion 17c, and is black in color as with the black reference portion 17b.

According to the image scanner 1 of Embodiment 2, ambient light entering from the side of the moving original scanning area 12 can be absorbed by the light absorbing portion 17g. Therefore, ambient light entering into the white reference portion 17a can be further reduced, and thereby further accurate shading data can be created.

In Embodiment 2, an internal surface 3a of a housing 3 is black and serves as an additional light absorbing portion.

Accordingly, ambient light, which has been transmitted through the platen glass 13 and has reached the internal surface 3a of the housing 3, is absorbed by the internal surface 3a before reaching the white reference portion 17a. Therefore, ambient light entering into the white reference portion 17a can be further reduced, and thereby further accurate shading data can be created.

Embodiment 3

The structure and operation of an image scanner 1 in Embodiment 3 are basically the same as in Embodiment 1.

Figure 13:
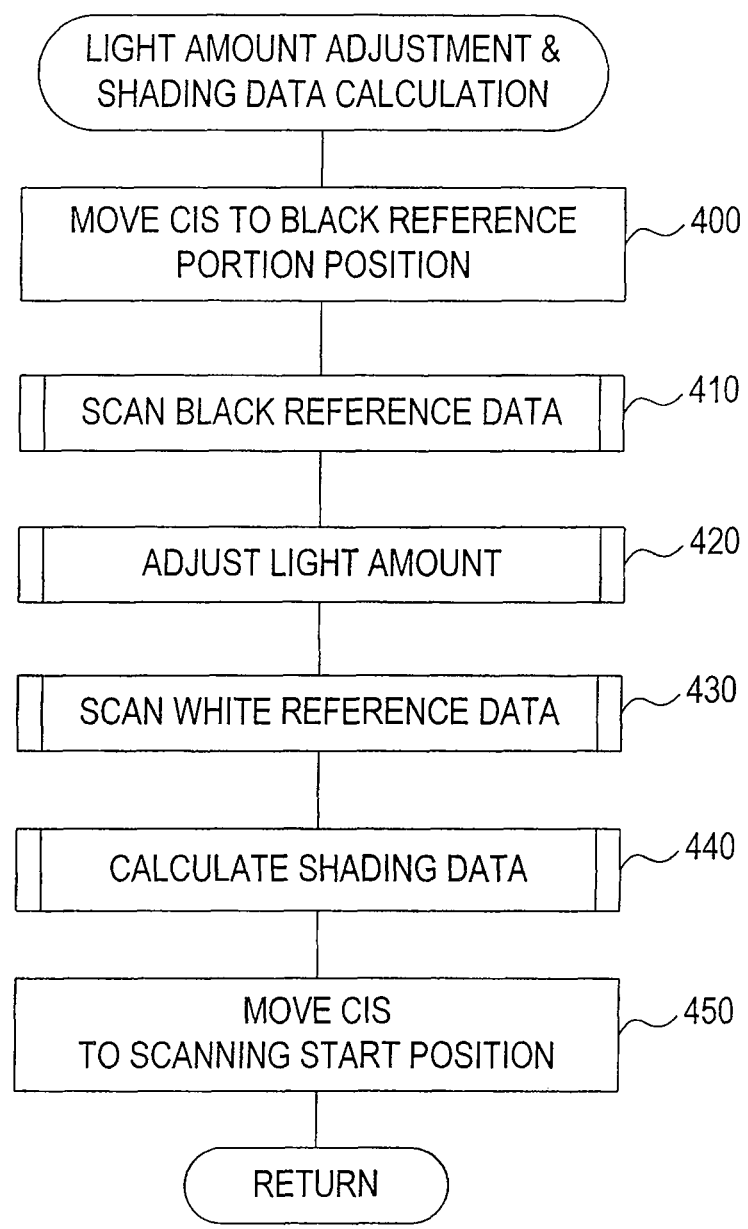
FIG. 13 is a flowchart for illustrating a third process of light amount adjustment and shading data calculation.

In Embodiment 3, however, a process of light amount adjustment and shading data calculation is performed as shown in FIG. 13.

In Step 400, when the start button in the operating portion 15 is pressed down, the motor 23 is rotated by a command issued by the CPU 101. Then, the image sensor 21 starts to move away from the home position HP in order to obtain black reference data and white reference data. After a movement of a specific distance from the home position HP, the image sensor 21 stops under the white reference portion 17a. After the movement, the image sensor 21 is positioned under the white reference portion 17a, as shown in FIG. 9A. The HP as the waiting position of the image scanner 21 and the method of making the image sensor 21 wait at a waiting position (a waiting step) is the same as in Embodiment 1.

In Step 410 (a black reference data obtaining process), scanning of the white reference portion 17a is performed a plurality of times with the light sources of the image sensor 21 turned off in order to scan black reference data. Then, the obtained data is divided by the number of times the scanning was performed with respect to each of the light receiving elements in order to calculate an average, and the average data is stored in the black reference buffer area 103a of the RAM 103 as the black reference data.

In Step 420, the CPU 101 adjusts the light amount of the light sources of the image sensor 21 to be suitable for subsequent capturing of white reference data. The method of light adjustment is the same as in Embodiment 1.

In Step 430 (a white reference data obtaining step), the image sensor 21 scans the white reference portion 17a. In this case, the motor 23 is rotated in forward and reverse directions, thereby to reciprocate the image sensor 21 under the white reference portion 17a. The range of reciprocation is between a point A corresponding to a position 1 mm from a left end of the white reference portion 17a and a point B corresponding to a position 1 mm from a right end of the white reference portion 17a. During the reciprocation, the light receiving elements obtain a plurality of pieces of data at different positions in the white reference portion 17a. The obtained plurality of pieces of data are divided by the number of times of scanning with respect to each of the light receiving elements, and are stored in the white reference buffer area 103b of the RAM 103 as white reference data.

In Step 440, the CPU 101 creates shading data by using the black reference data obtained in Step 410 and the white reference data obtained in Step 430. The created shading data is stored in the RAM 103.

In Step 450, the CPU 101 moves the image sensor 21 to a scanning start position. Subsequently, in the same manner as in Embodiment 1, image scanning of an original P is performed by irradiating light to the original P from the light sources of the image sensor 21 and by scanning the reflected light by the light receiving elements In Embodiment 3, as described above, the black reference data is obtained by scanning the white reference portion 17a with the light sources of the image sensor 21 turned off.

According to Embodiment 3, obtainment of the black reference data and the white reference data is performed with the image sensor 21 positioned under the white reference portion 17a. Therefore, the number of movements of the image sensor 21 as well as the moving distance of the image sensor 21 can be reduced. This allows easy control of the image sensor 21 and a reduction of time required for creating shading data.

It is to be understood that the present invention should not be limited to the above described embodiments, but may be embodied in various forms without departing from the spirit and scope of the present invention.

For example, the white reference portion 17a and the black reference portion 17b may be reversely arranged in Embodiments 1 through 3. That is, an arrangement may be employed in which the black reference portion 17b is located on a side of the moving original scanning area 12 of the under surface of the positioning member 17, and the white reference portion 17a is located in a center portion of the under surface of the positioning member 17.

While the white reference portion 17a and the black reference portion 17b are provided as separate members such that black reference portion 17b covers the white reference portion 17a in Embodiments 1 through 3, the white reference portion 17a and the black reference portion 17b may be provided as a single member by, for example, applying white color and black color thereon.

Also, while a CIS is employed as an image sensor 21 serving as a scanning device in Embodiments 1 through 3, a charge-coupled device (CCD) image sensor in the reduction optical system, for example, may be employed other than a contact-type image sensor, such as a CIS, as the scanning device in the present invention.

We claim:

1. An image scanner, comprising:
    a single transparent plate;
    a dividing member disposed on the single transparent plate and dividing the single transparent plate into a first area and a second area by extending in a first direction, the dividing member including a white portion in contact with an upper surface of the single transparent plate;
    a scanning device configured to scan a first original placed on the first area while moving along the first area, and to scan a second original being conveyed at the second area in a conveying direction while stopping at a position directly below the second area, the conveying direction being perpendicular to the first direction;
    a conveying device configured to convey the second original being scanned in the conveying direction at the second area; and
    a guide member disposed downstream of the second area in the conveying direction in which the second original being scanned is conveyed at the second area, the guide member including an inclined portion inclined upward relative to the upper surface of the single transparent plate, the inclined portion being configured to guide the second original scanned by the scanning device in a direction away from the upper surface of the single transparent plate,
    wherein at least a portion of the white portion of the dividing member is positioned upstream of the guide member in the conveying direction in which the second original being scanned is conveyed at the second area.

2. The image scanner according to claim 1, wherein the scanning device is configured to scan the white portion of the dividing member to obtain white reference data.

3. The image scanner according to claim 1, wherein the white portion of the dividing member includes a rectangular portion elongated in the first direction, a length of the rectangular portion in the first direction being shorter than a length of the dividing member in the first direction.

4. The image scanner according to claim 1, wherein the dividing member further includes a black portion in contact with the upper surface of the single transparent plate.

5. The image scanner according to claim 4, wherein the scanning device is configured to scan the black portion of the dividing member to obtain black reference data.

6. The image scanner according to claim 1, wherein the guide member supports the single transparent plate.

7. The image scanner according to claim 1, wherein the guide member is disposed at an end of the single transparent plate.

8. The image scanner according to claim 1, wherein the dividing member and the guide member are spaced from each other and define the second area therebetween.

9. The image scanner according to claim 1, further comprising a feed tray and an exit tray, wherein the conveying device is configured to convey the second original along a U-shaped path from the feed tray to the exit tray via the second area so as to invert the second original, and the inclined portion of the guide member defines a part of the U-shaped path.

10. The image scanner according to claim 1, further comprising a cover configured to pivot relative to the guide member and cover the first area and the second area of the single transparent plate, the dividing member, and the guide member.

11. The image scanner according to claim 1, wherein the scanning device comprises a contact image sensor.

* * * * *